Figure 1:
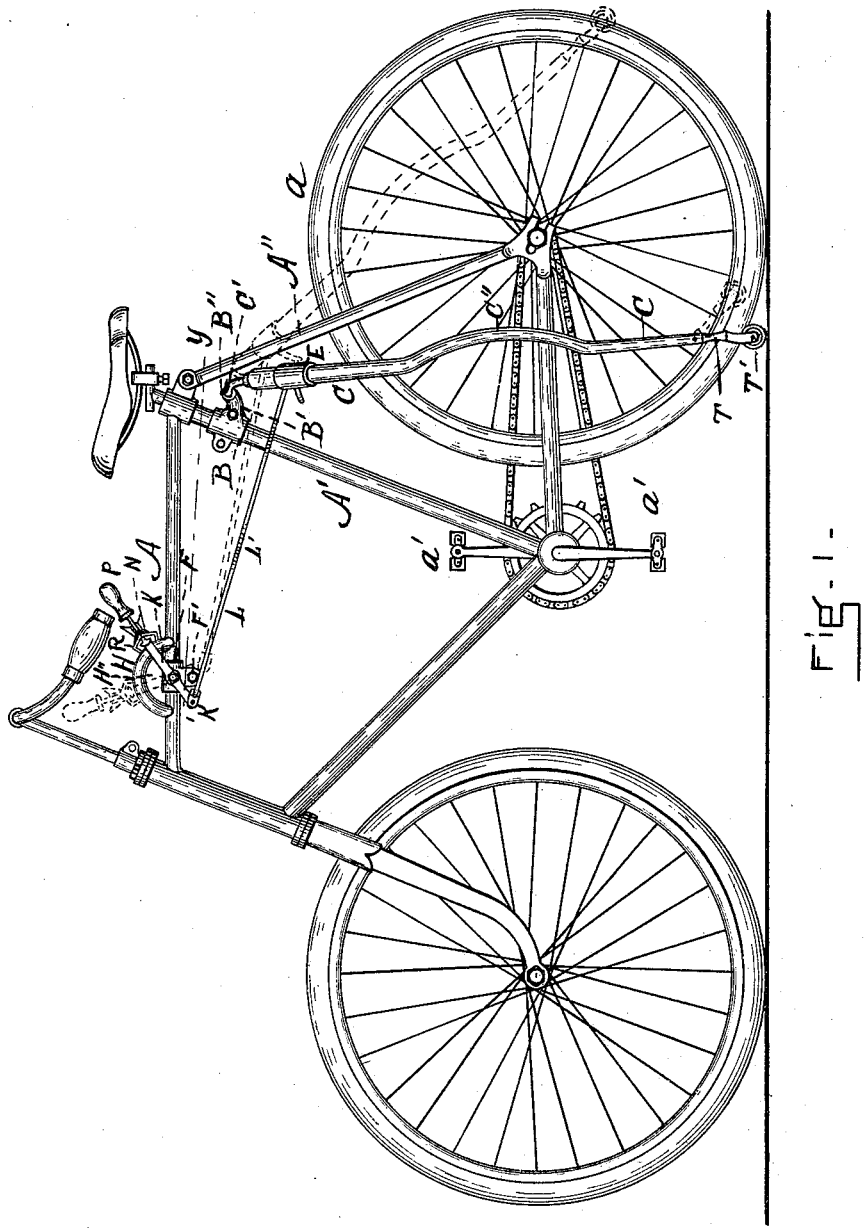

No. 610,536. Patented Sept. 13, 1898.
G. HIPWOOD.
BICYCLE SUPPORT.
(Application filed July 27, 1897.)
(No Model.) 3 Sheets—Sheet 1.

WITNESSES
A. N. Pomroy.
A. G. Pomroy.

INVENTOR
George Hipwood,
By his Att'y
Henry W. Williams

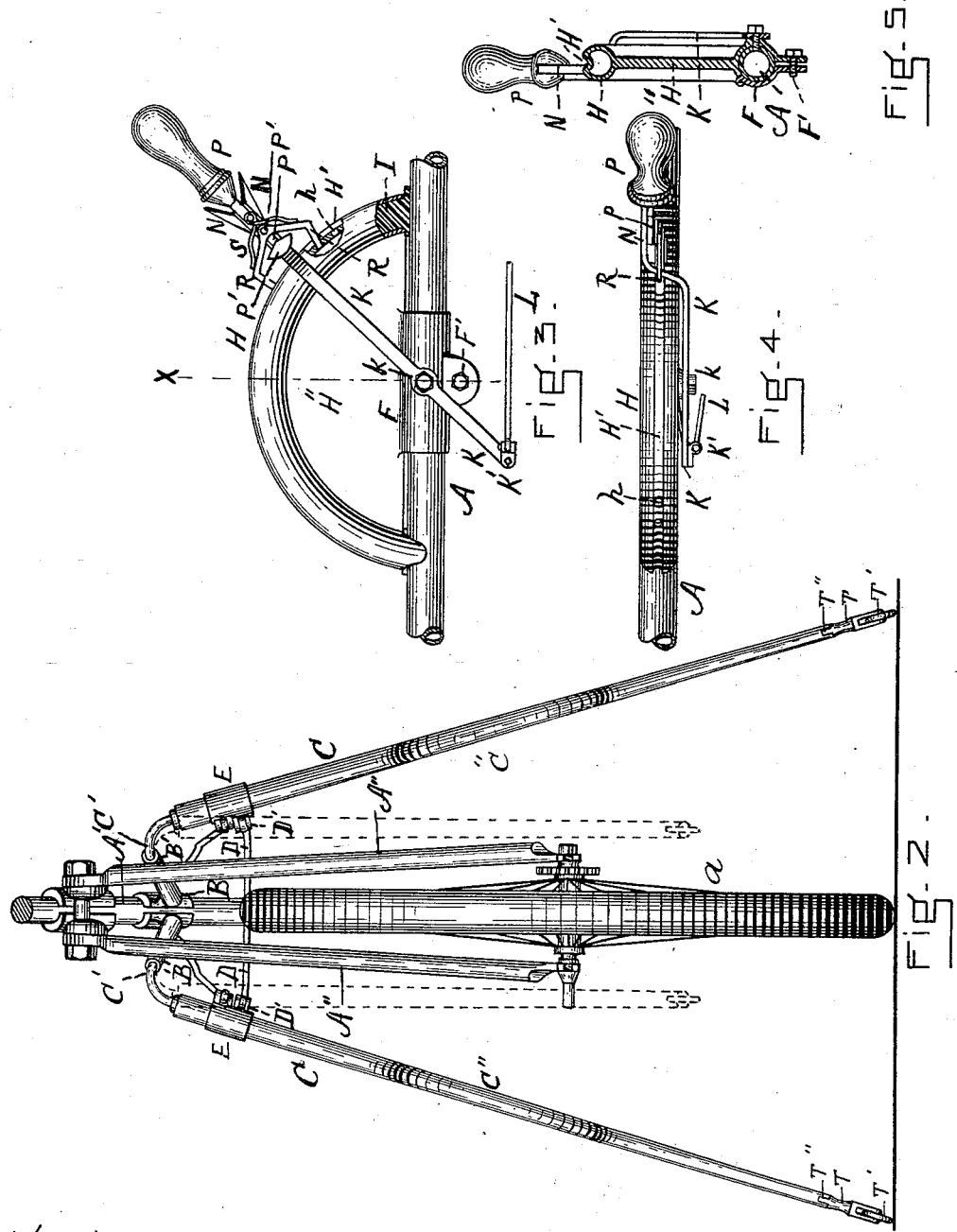

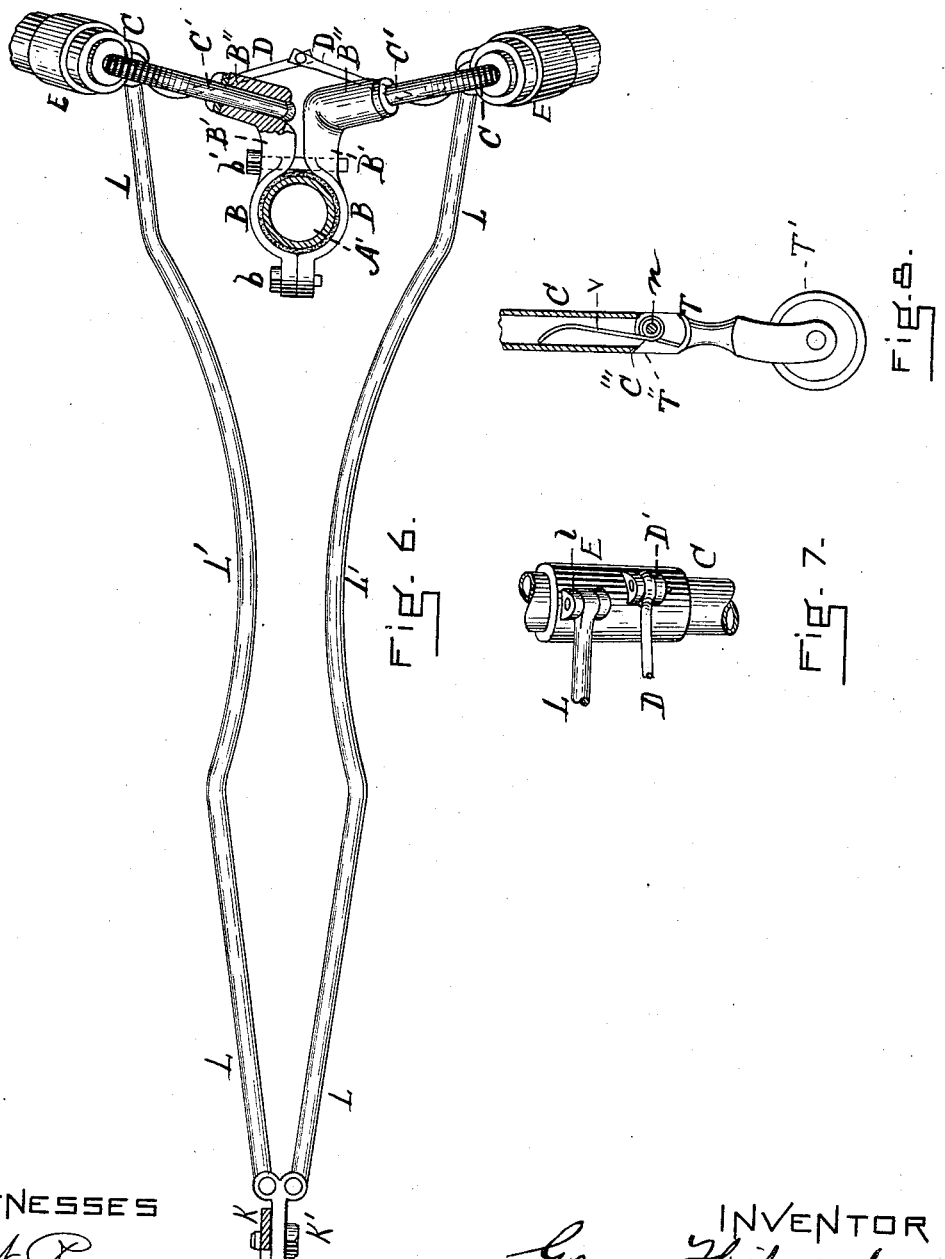

UNITED STATES PATENT OFFICE.

GEORGE HIPWOOD, OF BOSTON, MASSACHUSETTS.

BICYCLE-SUPPORT.

SPECIFICATION forming part of Letters Patent No. 610,536, dated September 13, 1898.

Application filed July 27, 1897. Serial No. 646,068. (No model.)

*To all whom it may concern:*

Be it known that I, GEORGE HIPWOOD, a citizen of the United States, residing in Boston, in the county of Suffolk and State of Massachusetts, have invented a new and useful Improvement in Bicycle-Supports, of which the following is a specification.

This invention relates to that class of bicycle-supports in which the supporting device is attached to the bicycle and remains in position while the machine is in use, and it relates particularly to that class of supporting attachments in which the device can be brought into operation by the rider from his seat while the machine is in motion and support said machine in an upright position while it is moving over the ground and until and after it has come to a standstill and be withdrawn from a supporting position by the rider from his seat, whether the machine is stationary or in motion.

The invention consists in certain novel constructions and arrangements of parts whereby the above-mentioned effects are produced in such a manner that a broad base of support is furnished, whereby ample provision is made for the movement of the legs and feet of the rider and the pedals of the machine, whereby the device is, when raised, swung rearward and inward toward the wheel, whereby provision is made for the yielding of the attachment to obstructions on the ground when lowered without impairing its efficiency and for locking such attachments in different positions, and whereby in other respects the device is rendered more efficient in operation and simple in construction.

The nature of the invention in detail is fully described below and illustrated in the accompanying drawings, in which—

Figure 1 is a side elevation of a bicycle of the safety type provided with my attachment, which is illustrated in full lines as in position for supporting the wheel and in broken lines as raised. Fig. 2 is a rear elevation of the same. Fig. 3 is an enlarged side elevation or detail of the operating and locking mechanism, portions being broken out the better to illustrate the construction. Fig. 4 is a plan view of the same. Fig. 5 is a vertical section taken on line X, Fig. 3. Fig. 6 is an enlarged plan taken on line Y, Fig. 1, a small portion being represented as broken out. Fig. 7 is an inside elevation in detail, showing the means of connecting the jointed brace and connecting the rods with the supporting-legs. Fig. 8 is an enlarged detail, in side elevation and vertical section, of the lower end of one of the supporting-legs.

Similar letters of reference indicate corresponding parts.

A and A' represent portions of the frame of an ordinary bicycle, A'' is the rear fork, $a$ is the rear or driving wheel, and $a'$ the pedals, all constructed as usual.

B, Figs. 1, 2, and 6, is a clip made in two parts and clamped to the portion A' of the frame by means of suitable bolts $b$ and $b'$. The two portions of this clip are formed with rearward extensions B', from which extend the tubular supports B''. These supports extend oppositely at the substantially upward and rearward angles shown in Figs. 2 and 6, for a purpose below described. Extending into these tubular supports, supported thereby and turning therein, are the upper inwardly-bent ends C' of the supporting-legs C, such portions C' being substantially at right angles with the main portions of the legs. The legs are each formed with a central rearwardly-extending curvature C'', Fig. 1, and are adapted to be swung down into the position indicated in full lines in Figs. 1 and 2 and swung up and back into the positions indicated in broken lines in said figures. When the legs are down, their lower ends touch the ground outside of the rear wheel and in front of the part of the wheel which rests on the ground. Hence there are three resting-points constituting a broad base of support, like that of a tripod. The curvatures allow the legs to be brought well forward, thus making a firmer support without interfering with the pedals or the feet of the rider. When the legs are raised, they extend on lines which are not inharmonious with the lines of the machine, and by reason of the directions of the opposite, upward, outward, and rearward angles of the tubes B' the legs are when raised swung inward toward the rear wheel and assume the position indicated by broken lines in Fig. 2, thus occupying as little space as possible when not in use. The two legs are connected by a jointed lever or toggle D, whose opposite ends are pivotally connected to ears D′, extending from collars or clips E, rigid on said legs, as shown in Figs. 2 and 7, and when the legs are swung down for use as supports they spread, and the jointed lever D straightens and acts as a brace, or the joint may go a trifle forward of a straight line.

Set on the upper side of the portion A of the frame of the bicycle is a curved frame H, consisting of a tube formed on its upper edge with a longitudinal groove H′. (See Figs. 1, 3, 4, and 5.) The ends of this frame H are seated on rubber cushions I, which absorb vibration and prevent injury to the frame of the bicycle. Within the groove H′, preferably near its opposite ends, the tube H is provided with perforations $h$.

A plate or web H″ is rigidly secured to the under side of the tube H and is provided with a hinged clip F, whereby the contrivance is secured to the part A by a bolt F′.

A lever K is pivoted at $k$ to the clip and is pivotally connected at K′ to the joined forward ends of the connecting-rods L, whose rear ends are secured to the ears $l$ on the inner sides of the clips E. (See Figs. 1, 2, 6, and 7.) The upper end of this lever is provided with the rigid wings N.

A handle P is hinged at P″ to the lever K and is provided with the engaging dog P′.

A V-shaped engaging tooth or pawl R is loose on the pivot P″ and extends on opposite sides of the dog P′.

A spring S is secured centrally to the handle and bears normally on the opposite ends of the pawl R.

In practical operation when it is desired to lift the support from the position indicated in full lines in the drawings and swing it back into the position indicated in broken lines the handle P is pushed forward until it strikes the wing N in front of it. This causes the rear tooth of the pawl R to be lifted from the perforation $h$ into which it extends by means of the dog P′, which is swung up by the forward movement of the handle, and as the handle is moved forward into the position indicated in broken lines in Fig. 1 it carries with it the lever K (from which the wings N extend) and pushes up the legs C by means of the rods L, the forward tooth of the pawl R dropping into one of the forward holes $h$ in the groove H′. During this operation the pawl slides in said groove, and the spring S forces the pawl into operation. To drop the legs, the operation is reversed. Thus the support is locked in either a raised or dropped position. In order to avoid the legs of the rider, the rods L are curved inwardly at L′, Fig. 6. The legs, which are preferably tubular, have pivoted to their lower ends at $n$ casters consisting of shanks T and wheels T′. (See Fig. 8.) The lower forward portions of the ends of the legs are recessed up at C‴, and the corresponding portions of the shanks are extended up at T″, so that the center of the wheels T′ may be a trifle forward of the lines of the legs, being held in such position by the springs V. In case a large stone or obstruction is met by the casters the portions T double back, as shown in broken lines in Fig. 1, and pass over it and immediately return to their original position. By means of the construction of the parts C‴ and T″ any danger of these parts doubling back without meeting an obstruction is avoided.

As will readily be seen, the support can be dropped while the machine is in motion or at rest, and especially when it is about to be brought to a standstill. It is deemed to be particularly useful in military service, for firemen, postmen, messengers, &c., and for ladies and all others desiring to be seated on their bicycles while not in motion.

Having thus fully described my invention, what I claim, and desire to secure by Letters Patent, is—

1. In a bicycle-support, the sustaining-rods C pivotally secured at their upper ends to the upper portion of the frame of the bicycle above the driving-wheel and substantially under the saddle and adapted when dropped to rest on the ground on opposite sides of the rear wheel and in front of the point of contact of the rear wheel with the ground, and being when in such dropped position substantially vertical, whereby a broad base having the effect of a tripod is provided for sustaining the bicycle, said rods C being provided centrally with the positive rearward curvatures or recesses C″ but being otherwise straight, substantially vertical and extending from the ground to a point well above the driving-wheel, whereby the rods may be well forward without interfering with the feet of the rider upon the pedals; and mechanism secured to the frame of the bicycle within reach of the rider whereby the sustaining-rods may be swung rearward and upward, substantially as set forth.

2. In a bicycle-support, in combination with a bicycle, the clip B rigidly secured to the portion A′ of the frame, said clip being provided with the rearward extensions B′ and each said extension being formed with the tubular supports B″ extending oppositely at substantially the upward and rearward angles described; the supporting-rods C bent at their upper ends at C′ inward at substantially right angles and with said ends extending into and swinging in said tubular supports B″; and mechanism secured to the frame within reach of the rider whereby the sustaining-rods may be swung from a substantially vertical dropped position in front of the axle of the rear wheel rearward, upward and at inward angles toward said wheel, substantially as set forth.

3. In a bicycle-support, in combination with a bicycle, the clip B secured to the portion A′ of the frame and provided with rearward extensions B′; the tubular supports B″ extending outwardly, rearwardly and upwardly therefrom at substantially the angles described; the sustaining-rods C swinging in said tubular supports by means of the right-angled upper portions C'; the jointed lever or brace D pivoted at its opposite ends to and connecting said sustaining-rods; a handle pivotally connected to the frame of the bicycle within reach of the rider; and rods L connecting said handles with the sustaining-rods, whereby the sustaining-rods are adapted to be swung from a substantially vertical position on the ground upward, and rearward at inward angles toward the driving-wheel, substantially as set forth.

4. In a bicycle-support, in combination, the sustaining-rods C pivotally secured at their upper ends to the frame of the bicycle; the curved or arc-shaped frame H provided with the groove H' suitably perforated at $h$, said frame being secured to the frame of the bicycle within reach of the rider; the lever K pivotally connected with the bicycle-frame and set radially with relation to the curved frame H, said lever being provided with the stops or wings N; the handle P pivotally connected at P'' with the lever K and provided at its lower end with the engaging dog P'; the rocking pawl R pivotally secured to the lever K and adapted to drop into said perforations $h$; the spring S secured to the handle and bearing upon the pawl; and the rods L connecting the lower end of the lever K with the supporting-rods, substantially as set forth.

5. In a bicycle-support, the sustaining-rods C pivotally connected at their upper ends with the frame of the bicycle and adapted to be locked in a dropped position and swung rearward into a raised position; and casters hinged to the lower ends of said rods and set with the axle of the wheels slightly forward of the pivotal connection between them and said rods, substantially as and for the purpose set forth.

GEORGE HIPWOOD.

Witnesses:
   HENRY W. WILLIAMS,
   B. W. WILLIAMS.